United States Patent [19]

Kosaka et al.

[11] 3,884,991

[45] May 20, 1975

[54] GRAFT-POLYMER OF VINYL CHLORIDE AND PRODUCING PROCESS THEREOF

[75] Inventors: Yujiro Kosaka; Masaru Uemura; Mitsutaka Saito; Yuji Suzuki; Kunio Takamoto, all of Shinnanyo, Japan

[73] Assignee: Toyo Soda Manufacturing Co., Ltd., Japan

[22] Filed: Nov. 18, 1971

[21] Appl. No.: 200,199

Related U.S. Application Data

[63] Continuation-in-part of Ser. No. 876,577, Nov. 13, 1969, abandoned.

[30] Foreign Application Priority Data

Nov. 11, 1968 Japan.................................. 43-85481

[52] U.S. Cl............ 260/878 R; 260/86.7; 260/87.3; 260/889; 260/897 C
[51] Int. Cl. ... C08f 15/02; C08f 15/24; C08f 15/30

[58] Field of Search .................................. 260/878 R

[56] References Cited
UNITED STATES PATENTS

| | | | |
|---|---|---|---|
| 3,322,857 | 5/1967 | Coaker et al. .................. | 260/878 R |
| 3,358,054 | 12/1967 | Bonn et al....................... | 260/878 R |
| 3,487,129 | 12/1969 | Platzer............................ | 260/878 R |

*Primary Examiner*—Harry Wong, Jr.
*Attorney, Agent, or Firm*—Wenderoth, Lind & Ponack

[57] ABSTRACT

The present invention provides a novel grafted polymer of vinyl chloride onto pre-chlorinated ethylene-vinyl acetate copolymer and/or pre-chlorinated ethylene-acrylic ester copolymer without post-chlorination. The grafted polymer has both favorable transparency and superior impact resistance. A novel process for producing said grafted polymer is also provided.

1 Claim, No Drawings

GRAFT-POLYMER OF VINYL CHLORIDE AND PRODUCING PROCESS THEREOF

CROSS-REFERENCE TO PRIOR APPLICATION:

This a continuation in-part of our co-pending application, Ser. No. 876 577, filed on Nov. 13, 1969 now abandoned.

BACKGROUND OF INVENTION:

The invention relates to a vinyl chloride polymer which has superior properties in both transparency and impact resistance, and process for the production thereof. The vinyl chloride polymers produced hitherto have numerous superior features, for example, adequate degree of hardness and mechanical strength, superior transparency, and non-flammability; yet on the other hand they have some drawbacks, namely inferior properties with respect to impact resistance, theremal stability and processability, so that their applications are limited with numerous drawbacks. Various experiments have been attempted to remove these drawbacks. Thus, a conventional process of blending various polymers, for example, a process of blending vinyl chloride polymer with elastomer, e.g., ethylene-vinyl acetate copolymer (hereafter referred to as "EVA copolymer"), chlorinated polyethylene ethylene-propylene-terpolymer, polybutadiene or a terpolymer of acrylonitrile-butadiene-styrene is well known.

But, an elastomer which can be commonly employed for improving impact resistance frequently has inferior compatibility with vinyl chloride polymer and the impact resistance properties are improved by blending, furthermore, as a result of the inferior compatibility blended polymer constitutes the inhomogeneity structure, the transparency of the blended polymer is remarkably impaired in all cases. Further, on the other hand, the improvement of compatibility by graft copolymerizing vinyl chloride onto the elastomer has been investigated, so the conventional graft copolymerizing technique is limited to the low graft efficiency. Consequently the large quantities of the elastomer, which is not graft copolymerized, retains in the result polymer. Accordingly, in the graft copolymerization of the vinyl chloride onto the elastomer such as EVA copolymer, ethylene-propylene terpolymer, polybutadiene, the large quantities of the elastomer, which is not graft copolymerized, retains in the result polymer and its result polymer consists of elastomer, small quantities of grafted polymer and polyvinyl chloride.

DETAILED DESCRIPTION OF INVENTION

An object of the invention is to provide an improved grafted polymer and a method for production thereof, which grafted polymer has both excellent transparency and impact resistance and further has superior weatherability even though has been hitherto regarded as difficult to obtain a polymer having both transparency and impact resistance.

The gist of the invention for accomplishing above-mentioned object is to provide a grafted polymer and process for production thereof which comprises co-polymerizing vinyl chloride onto pre-chlorinated EVA copolymer and/or prechlorinated ethylene-acrylic ester copolymer and thereby producing a polymer having both favorable transparency and superior impact resistance. The chlorination of the said ethylene copolymer is conducted by the conventional process, such as bulk, suspension or solution reaction in the presence of radical initiator. In that case, radical initiator such as organic peroxide, etc., for example, t-butyl perpivalate, t-butyl peroctoate, t-butyl peracetate, t-butyl perbenzoate, benzoyl peroxide, acetyl peroxide, is used on the amount of 0.01 – 5 wt.% based on the ethylene copolymer. Although the above chlorination reaction can be carried under liquid phase or suspension phase, but suspension phase is favorable, as follows. The ethylene copolymer, pulverized in the size of less than $2mm\phi$, preferably $50 - 600\mu\phi$, is suspended in water, if necessary, under the presence of surface active agent such as sodium lauryl sulfate, sodium dodecyl benzene sulfonate, and further under the ratio of water : ethylene copolymer being 1 – 10, and then the chlorination of the above ethylene copolymer is proceeded to extent of desired chlorine content. A degree of chlorination of pre-chlorinated EVA copolymer and/or pre-chlorinated ethylene-acrylic ester copolymer which copolymers are used as a main chain of grafted polymer, is in the range of 15 to 45 percent by weight, more preferably in the range of 30 to 40 percent by weight. Further, the amount of these chlorinated copolymer is selected in the range of 5 to 25 percent by weight, more desirably in the range of 5 to 15 weight percent based on the obtained grafted polymer.

An experiment which comprises graft copolymerization of vinyl chloride onto EVA copolymer and thereby improving impact resistance properties have been carried out, but this process can not give a polymer having superior transparency. In the invention, the main chain of grafted polymer is chlorinated product of EVA copolymer and/or ethylene-acrylic ester copolymer, therefore, the resultant polymer by this invention has superior impact resistance without impairing the transparency of vinyl chloride homopolymer. In other words, as vinyl chloride monomer is polymerized in the presence of pre-chlorinated EVA copolymer and/or pre-chlorinated ethylene-acrylic ester copolymer, for example, by a bulk, suspension, emulsion or solution polymerization process, a grafted polymer, which can be obtained by this invention has superior transparency as similar to that of vinyl chloride resin and further has remarkable improved impact resistance and processability. Further, such chlorinated product is free from double bonds from the view of molecular structure, so that the said grafted polymer has very strong resistance against oxidation deterioration and superior weatherability.

Further, the main chain of the grafted polymer is pre-chlorinated ethylene copolymer which has easy chain transferability, so that the chain transfer results at the chlorine attached to the pre-chlorinated ethylene copolymer with high probability when graft copolymerizing vinyl chloride monomer onto pre-chlorinated ethylene copolymer, and graft efficiency can be greatly increased.

A graft polymerization initiator is selected from an initiator for radical polymerization on the amount of 0.01 – 0.5% by weight based on vinyl chloride monomer. For example, benzoyl peroxide, lauroyl peroxide, azobisisobutyronitrile, tertiary-butyl peroxypivalate or the like are cited. The graft copolymerization is affected at the temperature from 30°C to 80°C, preferably 55°C to 65°C.

The original ethylene copolymer, used in the invention, can be obtained by conventional radical polymerization process, and has the following properties.

I. Content of combined ethylene: 50 – 97% by weight, preferably 80 – 95%
II. M.I. (Melt Index): 0.1 – 500g/10min., preferably 0.5 – 400g/10min.

The product by the invention consists of the grafted polymer and polyvinylchloride, which polyvinyl chloride has average degree of polymerization being 500 – 1,500.

The invention is illustrated but not restricted by the following examples.

EXAMPLE 1

Chlorination

In a 5 liter glass reactor, shielded from light and equipped with agitator, condenser and gas-inlet tube, 600 grams of ethylene-vinyl acetate copolymer (fine powder 150 – 600μ, pulverized by a turbo mill, having a vinyl acetate content of 6 weight percent and 0.5g/10min. of MI) are dispersed in 4 liters of water containing 2.4grams of sodium lauryl sulfate at 60°C. After a nitrogen purge to remove oxygen from the reactor, chlorine gas is added through an immersed sparger at a flow rate of 1,600 ml/min.

After saturation of the reaction mixture with chlorine (about 5 minutes) a radical initiator solution, 3.0 grams of t-butyl peroxypivalete and 60 milliliters of 40% chlorinated paraffin, is added and kept 60°C with the aid of a thermostatically controlled water bath under agitation (600rpm) of the reactor contents.

After 6 hours, the resin is filtered, washed with water and methanol and dried at 50°C under reduced pressure the chlorine content of the resin was 34% by weight.

In situ polymerization

The following ingredients were added to a 2 liter autoclave equipped with a mechanical stirrer : 200 grams of vinyl chloride, 25 grams of the chlorinated EVA copolymer prepared above mentioned method, comprising 34 weight percent of chlorine (the original EVA copolymer consisted of 6 weight percent of vinyl acetate and 0.5 of MI). This mixture was dissolved with stirring at 60°C for 1 hour.

To this mixture was further added 800 grams of deionized water, 150 grams of vinyl chloride, 1.2 grams of polyvinyl alcohol and 0.6 gram of laurayl peroxide. The polymerization was carried out at 60°C for 7 hours. At the end of this time, the particles of the graft polymer were filtered, washed with water, and dried in vacuo, and thus, 302 grams of the polymer was obtained.

In order to check the amount of non-grafted free chlorinated EVA copolymer in the produced grafted polymer, the said grafted polymer was extracted with carbon tetrachloride at the refluxing temperature for 16 hours, no extractable component such as non grafted chlorinated EVA copolymer was, however, identified. On the other hand, EVA copolymer was used in stead of the chlorinated EVA copolymer in Example 1, and the grafted polymer so obtained (Sample R) was found to contain 55 weight percent extractable (non grafted EVA) component in carbon tetrachloride extraction. Sample R was sufficiently chlorinated to compare the physical properties among them.

Three weight parts of the polymerized tin mercaptide stabilizer, Advastab T17MJ and one weight part of stearic acid were mixed on a rolling mill into 100 weight parts of the grafted polymer at 170°C and test specimens were prepared.

The properties are listed below:

|  | Grafted polymer in Example 1 | Sample R | Chlorinated Sample R | PVC p=1050 |
|---|---|---|---|---|
| Tensile strength(kg/cm$^2$) | 414 | 350 | 500 | 540 |
| Elongation (%) | 195 | 140 | 120 | 130 |
| Tensile impact strength (kg.cm/cm$^2$) | 188 | 155 | 155 | 150 |
| Softening temp. (°C) | 60 | 60 | 80 | 64 |
| Haze % | 3.0 | 56.0 | 55.0 | 2.5 |
| Processability (valumetric flow rate) (cm$^3$/sec.) | 0.16 | 0.23 | 0.08 | 0.05 |

EXAMPLE 2

A grafted polymer was prepared as described in Example 1 using the following ingredients; 365g vinyl chloride, 25g chlorinated EVA copolymer comprising 28.5 weight percent chlorine, (the original EVA copolymer consisted of 9 weight percent vinyl acetate and 9 of MI), 800ml of water containing 0.15 percent polyvinyl alcohol by weight and 0.6g of lauroyl peroxide. Dissolution was carried out at 61°C for 1 hour and polymerization was run at 61°C for 6 hours. The yield of the grafted polymer was 322g. No component was not extracted in carbon tetrachloride. The properties of the grafted polymer so obtained are listed below.

| Tensile strength | 460kg/cm$^2$ |
|---|---|
| Elongation | 210% |
| Tensile impact strength | 172 kg.cm/cm$^2$ |
| Softening temperature | 61°C |
| Clarity | 10.0% Haze |
| Processability | 0.27cm$^3$/sec. |

EXAMPLE 3

A grafted polymer was prepared as described in Example 1 using the following ingredients; 370g of vinyl chloride, 25g of chlorinated EVA copolymer comprising 18.1 weight percent chlorine, (the original EVA copolymer consisted of 18 weight percent vinyl acetate and 1.5g of MI), 800ml of water containing 0.15 weight percent of polyvinyl alcohol and 0.6g of lauroyl peroxide. Dissolution was carried out at 61°C for 1 hour and polymerization was run at 61°C for 6 hours. The yield of the grafted polymer was 302g. No component was extracted in carbon tetrachloride. The properties of the grafted polymer so obtained are listed below:

| | |
|---|---|
| Tensile strength | 450kg/cm² |
| Elongation | 210% |
| Tensile Impact strength | 177 kg.cm/cm² |
| Softening temperature | 58°C |
| Clarity | 18.0% Haze |
| Processability | 0.36cm³/sec. |

EXAMPLE 4

A grafted polymer was prepared as described in Example 1 using the following ingredients; 355g of vinyl chloride, 25g of chlorinated ethylene-ethylacrylate copolymer comprising 37.3 weight percent chlorine, (the original copolymer consisted of 18 weight percent ethylacrylate and 6 of MI), 800ml of water containing 0.15 weight percent polyvinyl alcohol and 0.6g of lauroyl peroxide. Dissolution was carried out at 61°C for 1 hour and polymerization was run at 61°C for 7.5 hours. The yield of the grafted polymer was 314g. No extractable component in carbon tetrachloride was not observed. The properties of the graftmer so obtained are listed below:

| | |
|---|---|
| Tensile strength | 480 kg/cm² |
| Elongation | 200% |
| Tensile impact strength | 177 kg.cm/cm² |
| Softening temperature | 58°C |
| Clarity | 6.0% Haze |
| Processability | 0.25 cm³/sec. |

EXAMPLE 5

A grafted polymer was prepared as described in Example 1 using the following ingredients; 347g of vinyl chloride, 25g of chlorinated EVA copolymer comprising 15.6 weight percent chlorine, (the original copolymer consisted of 8 weight percent vinyl acetate and 9.0 of MI), 800ml of water containing 0.15 weight percent polyvinyl alcohol and 0.6g of lauroyl peroxide. Dissolution was carried out at 61°C for 1 hour and polymerization was run at 61°C for 6 hours. The yield of the grafted polymer was 294g. No component was not extracted in carbon tetrachloride. The properties of the grafted polymer so obtained are listed below:

| | |
|---|---|
| Tensile strength | 400 kg/cm² |
| Elongation | 180% |
| Tensile impact strength | 185 kg.cm/cm² |
| Softening temperature | 62°C |
| Clarity | 25.0% Haze |
| Processability | 1.76 cm³/sec. |

EXAMPLE 6

A grafted polymer was prepared as described in Example 1 using the following ingredients; 365g of vinyl chloride, 25g of chlorinated EVA copolymer comprising 27.5 weight percent chlorine, (the original copolymer consisted of 18 weight percent vinyl acetate and 400 of MI), 800ml of water containing 0.15 weight percent polyvinyl alcohol and 0.6g of lauroyl peroxide. Dissolution was carried out at 61°C for 1 hour and polymerization was run at 61°C for 7.5 hours. The yield of the grafted polymer was 330g. No extractable material in carbon tetrachloride was identified. The properties of the grafted polymer so obtained are listed below:

| | |
|---|---|
| Tensile strength | 455 kg/cm² |
| Elongation | 190% |
| Tensile impact strength | 163 kg.cm/cm² |
| Softening temperature | 59°C |
| Clarity | 12.6% Haze |
| Processability | 0.29cm³/sec. |

EXAMPLE 7

To stainless steel ampoule of 200ml capacity was placed 110g of vinyl chloride, 10of chlorinated EVA copolymer containing 21.1 weight percent chlorine (the original copolymer comprised 6 weight percent vinyl acetate and 0.5 of MI) and 0.2g of lauroyl peroxide.

Then, three pieces of stainless steel balls having 2cm of diameter for the use of agitation were put into the ampoule, and the ampoule was rotated in air oven at 60°C for 6 hrs. The yield of the grafted polymer was 102g. No extractable component in carbon tetrachloride was observed. The properties of the grafted polymer so obtained are listed below:

| | |
|---|---|
| Tensile strength | 432 kg/cm² |
| Elongation | 165% |
| Tensile impact strength | 176 kg.cm/cm² |
| Softening temperature | 60°C |
| Clarity | 11.5% Haze |
| Processability | 0.35 cm³/sec. |

EXAMPLE 8

A grafted polymer was prepared as described in Example 1 using the following ingredients; 353g of vinyl chloride, 25g of chlorinated ethylene-ethylacrylate copolymer which consists of 20.3 weight percent chlorine, (the original copolymer comprised 18 weight percent ethylacrylate and 6 of MI), 800ml of water containing 0.15 weight percent polyvinyl alcohol and 0.6g of lauroyl peroxide. Dissolution was carried out at 61°C for 1 hour and polymerization was run at 61°C for 7 hours. The yield of the grafted polymer was 298g. No extractable material in carbon tetrachloride was observed. The properties of the grafted polymer so obtained are listed below:

| | |
|---|---|
| Tensile strength | 435 kg/cm² |
| Elongation | 185% |
| Tensile impact strength | 173 kg.cm/cm² |
| Softening temperature | 60°C |
| Clarity | 20.0% Haze |
| Processability | 0.33 cm³/sec. |

EXAMPLE 9

A grafted polymer was prepared as described in Example 1 using the following ingredients; 359g of vinyl chloride, 25g of chlorinated EVA copolymer comprising 37 weight percent chlorine (the original EVA copolymer consisted of 6 weight percent vinyl acetate and 0.5 of MI), 800ml of water containing 0.15 weight percent polyvinyl alcohol and 0.4g of tert-butyl-peroxypivalate. Dissolution was carried out at 55°C for 1 hour and polymerization was run at 55°C for 6 hours. The yield of the grafted polymer was 310g. Any component was not extracted in carbon tetrachloride. The properties of the grafted polymer so obtained are listed below:

| | |
|---|---|
| Tensile strength | 485 kg/cm² |
| Elongation | 200% |
| Tensile impact strength | 205 kg.cm/cm² |
| Softening temperature | 61°C |
| Clarity | 3.0% Haze |
| Processability | 0.19 cm³/sec. |

EXAMPLE 10

A grafted polymer was prepared as described in Example 1 using the following ingredients; 362g of vinyl chloride, 25g of chlorinated EVA copolymer containing 34 weight percent chlorine (the original copolymer comprised 6 weight percent vinyl acetate and 0.5 of MI), 800ml of water containing 0.15 weight percent polyvinyl alcohol, and 0.6g of zoisobutyronitrile. Dissolution was carried out at 65°C for 1 hour and polymerization was run at 65°C for 4 hours. The yield of the grafted polymer was 305g. No extractable material in carbon tetrachloride was observed. The properties of the grafted polymer so obtained are listed below:

| | |
|---|---|
| Tensile strength | 380 kg/cm² |
| Elongation | 195% |
| Tensile impact strength | 160 kg.cm/cm² |
| Softening temperature | 60°C |
| Clarity | 4.0% Haze |
| Processability | 0.21 cm³/sec. |

EXAMPLE 11

A grafted polymer was prepared as described in Example 1 using the following ingredients; 359g of vinyl chloride, 15g of chlorinated ethylene-ethylacrylate copolymer consisting of 37.3 weight percent chlorine (the original copolymer comprised 18 weight percent ethylacrylate and 6 of MI), 15g of chlorinated EVA copolymer containing 34 weight percent chlorine (the original EVA copolymer comprised 6 weight percent vinyl acetate and 0.5 of MI), 800ml of water containing 0.15 weight percent polyvinyl alcohol and 0.6g of lauroyl peroxide. Dissolution was carried out at 61°C for 1 hour and polymerization was run at 61°C for 7.5 hours. The yield of the grafted polymer was 326g. No extractable material in carbon tetrachloride was not observed.

| | |
|---|---|
| Tensile strength | 438 kg/cm² |
| Elongation | 190% |
| Tensile impact strength | 185 kg.cm/cm² |
| Softening temperature | 61°C |
| Clarity | 6.5% Haze |
| Processability | 0.24 cm³/sec. |

EXAMPLE 12

A grafted polymer was prepared as described in Example 1 using the following ingredients; 351g of vinyl chloride, 25g of chlorinated EVA copolymer containing 25 weight percent chlorine (the original copolymer comprised 42 weight percent vinyl acetate and 10 of MI), 800ml of water containing 0.15 weight percent polyvinyl alcohol, and 0.6g lauroyl peroxide. Dissolution was carried out at 63°C for 1 hour and polymerization was run at 63°C for 7 hours. The yield of the grafted polymer was 293g. No component was not extracted in carbon tetrachloride. The properties of the grafted polymer so obtained are listed below:

| | |
|---|---|
| Tensile strength | 410 kg/cm² |
| Elongation | 170% |
| Tensile impact strength | 176 kg.cm/cm² |
| Softening temperature | 56°C |
| Clarity | 6.5% Haze |
| Processability | 1.57 cm³/sec. |

EXAMPLE 13

A grafted polymer was prepared as described in Example 1 using the following ingredients; 326g of vinyl chloride, 35g of chlorinated EVA copolymer containing 43.4 weight percent chlorine (the original polymer comprised 9 weight percent vinyl acetate and 3 of MI), 800ml of water containing 0.15 weight percent polyvinyl alcohol and 0.3g of lauroyl peroxide. Dissolution was carried out at 65°C for 1 hour and polymerization was run at 65°C for 4 hours. The yield of the grafted polymer was 164g. No extractable component in carbon tetrachloride was not observed. The properties of the grafted polymer so obtained are listed below:

| | |
|---|---|
| Tensile strength | 350 kg/cm² |
| Elongation | 170% |
| Tensile impact strength | 161 kg.cm/cm² |
| Softening temperature | 57°C |
| Clarity | 18.0% Haze |
| Processability | 1.66 cm³/sec. |

EXAMPLE 14

A grafted polymer was prepared as described in Example 1 using the following ingredients; 305g of vinyl chloride, 35g of chlorinated ethylene-ethylacrylate copolymer containing 41.3 weight percent chlorine (the original copolymer comprised 18 weight percent ethylacrylate and 6 of MI), 800ml of water containing 0.15 weight percent polyvinyl alcohol and 0.3g of lauroyl peroxide. Dissolution was carried out at 63°C for 1 hour and polymerization was run at 63°C for 6 hours. The yield of the grafted polymer was 153g. No extractable component in carbon tetrachloride was observed. The properties of the grafted polymer so obtained are listed below:

| | |
|---|---|
| Tensile strength | 430 kg/cm² |
| Elongation | 190% |
| Tensile impact strength | 169 kg.cm/cm² |
| Softening temperature | 54°C |
| Clarity | 14.0% Haze |
| Processability | 0.95 cm³/sec. |

What is claimed is:
1. A graft copolymer blend comprising
    a. polyvinylchloride grafted onto chlorinated ethylene vinyl acetate copolymer, and
    b. polyvinyl chloride,
    said blend containing 5 to 25% by weight of said chlorinated ethylene vinyl acetate, said chlorinated ethylene vinyl acetate containing 15 to 45% by weight chlorine; said chlorinated ethylene vinyl acetate, prior to chlorination, containing 50 to 97% by weight of combined ethylene and having a melt index of 0.1 to 500g/10 min., said blend being prepared by reacting 15 to 35 parts by weight of said chlorinated ethylene vinyl acetate with 326 to 370 parts by weight vinyl chloride in the presence of a radical initiator at a temperature of 30° to 80° C.

* * * * *